United States Patent Office 3,147,071
Patented Sept. 1, 1964

3,147,071
PROCESS OF MANUFACTURING DICHLORO-
SILANE
Herbert Jenkner, Hannover-Wulfel, Germany, assignor to
Kali-Chemie Aktiengesellschaft, Hannover, Germany
No Drawing. Filed Jan. 3, 1962, Ser. No. 164,174
Claims priority, application Germany Jan. 5, 1961
5 Claims. (Cl. 23—14)

This invention relates to a method of producing dichlorosilane in relatively high yields.

Halogenated silanes are valuable products which are used industrially for various purposes. The most interesting chlorosilane from the tecrhnological viewpoint is dichlorosilane, $SiH_2Cl_2$; which by reaction with olefins can very easily be converted into alkylsilicon chlorides which can thereupon, through hydrolysis, be transformed into alkyl siloxanes (silicones). Another important use of dichlorosilane is as a catalyst in the polymerization of olefins and for the production of purest silicon.

A disclosed process for producing chlorosilanes comprises the reaction of $SiH_4$ with HCl or $Cl_2$, respectively, according to the following equations:

$$SiH_4 + HCl \rightarrow SiH_3Cl + H_2 \qquad (1)$$

$$SiH_4 + Cl_2 \rightarrow SiH_3Cl + HCl \qquad (2)$$

It can be seen that from a raw material standpoint, such reactions are inherently uneconomical, since part of the hydrogen bound to the silicon is removed and substituted by halogen. Therefore, for this and other reasons, these processes have not been used in the art.

Also, in U.S. Patent 2,900,225, there is taught a method of decomposing $SiH_4$ with $SiCl_4$ to obtain mixed chlorosilanes of the formula $SiH_xCl_{4-x}$. In order to carry out such reactions at a significant rate, however, the presence of Friedel-Crafts catalysts is required. Unfortunately, these Friedel-Crafts catalysts not only effect the rate to $SiH_xCl_{4-x}$, but they also act as decomposition catalysts, whereby impure silicon metal is precipitated and hydrogen is evolved, thereby lowering the yield of the desired products, and forming incrustations of adherent silicon metal on the interior walls of the reaction vessel.

A principal object of this invention, therefore, is to provide a process for producing dichlorosilane in high yields.

Another object is to provide a process for manufacturing dichlorosilane which substantially eliminates the production of silicon metal, thereby avoiding expensive shutdown operations for cleaning.

Still another object is to provide a process for manufacturing dichlorosilane wherein moderate pressures and temperatures can be employed, thereby avoiding expensive and hazardous operating conditions.

Still further objects and advantages of this invention will become apparent upon further study of the specification and appended claims.

To accomplish these objects, it has been discovered that halogen silanes, particularly dichlorosilane, can be produced in high yields by reacting silane with silicon halide in contact with a catalyst which exhibits a specific catalytic activity towards the reaction mechanism producing halogenated silanes, particularly dichlorosilane. This reaction can be conducted at a wide range of temperatures, for example, 30–550° C., preferably 150–250° C., the most preferred reaction temperature being dependent on the type of silane, the type of silicon halide, and the particular catalyst that is employed. The reaction is preferably conducted under elevated pressures; however, excellent yields can also be obtained by operating at normal or reduced pressures.

It is to be appreciated that the nature of the catalyst is an essential feature of this invention, inasmuch as it has been discovered that certain catalysts will function in a manner highly superior to the Friedel-Crafts catalysts employed in U.S. Patent 2,900,225. In other words, whereas the Friedel-Crafts catalysts deleteriously affect the overall yields of halogenated silanes, by acting as a catalyst for the decomposition of the silanes into silicon and hydrogen, the catalysts of the present invention function only to increase the rate of reaction of the production of halogenated silanes, without any significant decomposition of silanes into silicon and hydrogen.

The catalysts that can be employed in this invention are as follows: active aluminum oxides, silicon dioxides, and in particular dry activated carbon. It is also possible to employ mixtures of the oxides with the activated carbon. It is preferred to employ an activated carbon having a diameter of 1–3 mm.

This invention is exceptionally useful in producing dichlorosilane from silicon tetrachloride and monosilane according to the following equation:

$$SiH_4 + SiCl_4 \rightarrow 2SiH_2Cl_2 \qquad (3)$$

In this reaction a high yield of $SiH_2Cl_2$ is obtained without any separation of elementary silicon. The other chlorosilanes, like $SiH_3Cl$ and $SiHCl_3$, can be formed into additional dichlorosilane by reacting them with each other or of $SiH_3Cl$ with more $SiCl_4$ in the presence of the catalysts of this invention.

If in Equation 3 the mol relationship between $SiH_4$ and $SiCl_4$ is varied, silanes are obtained having a corresponding lower or higher chlorine content. An excess of monosilane yields mainly $SiH_3Cl$ and an excess of silicon tetrachloride yields mainly $SiHCl_3$.

Of course, this invention also applies to the reaction of partially substituted silanes with partially substituted silicon halides, including bromides and chlorides as the preferred species. For example, as the partially substituted silanes, it is possible to employ silanes of the formula: $R_nSiH_m$, wherein R is an alkyl having from 1 to 12 carbon atoms, $n$ is an integer from 1 to 3, and $m$ is an integer from 1 to 3, $n$ plus $m$ adding up to 4, an example being methyl silane $CH_3SiH_3$.

Likewise, the silicon halogenides can be particularly represented by the formula: $R_pSiX_q$, wherein R is an alkyl having from 1 to 12 carbon atoms, $p$ is an integer of from 1 to 3, and $q$ is an integer of from 1 to 3, $p$ plus $q$ adding up to 4. Examples of these compounds are methyltrichlorosilane, methyltribromosilane, and vinyltrichlorosilane, which, upon reaction with $SiH_4$ result in monomethylmonochlorosilane, monomethylmonobromosilane and monovinylmonochlorosilane, respectively. These organo-substituted halogenated silanes can then be used as polymerisation catalysts for olefins, reducing agents, eventually in the presence of activators, for the production of functional organo-halosilanes and the like.

Correspondingly, similar compounds are obtained when the substituted silicon halogenides are reacted with the substituted silanes, which compounds contain Si—C—, Si—H—, and Si—Cl— compounds.

It is also possible to react halogenated silanes having differing halogen contents with one another, for example, according to the following equation:

$$SiH_3Cl + SiHCl_3 \rightarrow 2SiH_2Cl_2 \qquad (4)$$

In order to provide one skilled in the art with an even better understanding of the invention, reference is made to the following preferred specific embodiment, which example, however, is not intended to be limitative of the specification and claims in any way whatsoever.

Example

Into an autoclave of a capacity of 250 cc. are filled under inert atmosphere of $H_2$ or $N_2$ 48 g. of $SiCl_4$ and 2.5 g. of a previously dried oxygen-poor activated carbon, said carbon being obtained by treating it under vacuum at 200–400° C. for 1–10 hours. (The diameter of the carbon is 1–3 mm., such a carbon being commercially available, for example, by E. Merk AG, Darmstadt, Germany.) Then, $SiH_4$ is introduced until a pressure of 52 atmospheres gauge is readable, and the whole is agitated for three hours at a temperature of 170° to 190° C. Thereafter, 45 g. of a chlorosilane mixture of approximately the following composition is obtained:

15% of $SiH_3Cl$
59% of $SiH_2Cl_2$
23% of $SiHCl_3$

Only about 3% of the initial $SiCl_4$ is not converted; and of great importance is that no separation of silicon can be observed in the autoclave.

If 4 g. of $AlCl_3$ as in U.S. Patent 2,900,225, are used as a catalyst instead of active carbon under the same conditions, 44 g. of a chlorosilane mixture is obtained consisting of About 7% of $SiH_3Cl$
6% of $SiH_2Cl_2$
17% of $SiHCl_3$ Thus, approximately 69% of the initial $SiCl_4$ is unconverted and, moreover, a deleterious precipitate of silicon can be noticed in the reaction vessel.

As can be seen from the foregoing comparative experiment, the process of the present invention yields a reaction mass containing 59% $SiH_2Cl_2$ which is, of course, approximately a 10-fold improvement over the 6% content realized when $AlCl_3$ is used as the catalyst according to U.S. Patent 2,900,225. Furthermore, the 59% content achieved by the present invention is substantially higher than any of the results of the examples in U.S. Patent 2,900,225. Still further, the absence of the formation of metallic silicon in the present invention is a great advantage as, among other things, down-time for cleaning is kept to a minimum.

Thus, the great superiority of activated carbon as a catalyst in the reaction between $SiH_4$ and $SiCl_4$ as compared with the Friedel-Crafts catalysts can be seen from the foregoing comparative experiment.

Substantially, the same superiority is evidenced when activated carbon is mixed with aluminum oxide and silicon oxide.

With respect to the aluminum and silicon oxides, it is preferred to employ a finely divided and dried material.

From the foregoing description, one skilled in the art can easily ascertain the essential characteristics of this invention, and without departing from the spirit and scope thereof, can make various changes and modifications of the invention to adapt it to various usages and conditions. For example, different halogens can be substituted for chlorine, and organo-substituted silanes, as well as organo-substituted silicon halides can be employed. Consequently, such changes and modifications are properly, equitably and intended to be within the full range of equivalence of the following claims.

What I claim is:

1. A process for the production of $SiH_2Cl_2$ which comprises reacting monosilane with silicon tetrachloride at 30–550° C., and in contact with a catalyst of dry activated carbon.

2. The process of claim 1, wherein the dry activated carbon is previously heated under vacuum for 1–10 hours at 200–400° C.

3. The process of claim 1, wherein the reaction temperature is 150–250° C.

4. The process of claim 1, wherein the reaction is conducted at from reduced pressure to 100 atmospheres.

5. A process for the production of $SiH_2Cl_2$ which comprises reacting monosilane with silicon tetrachloride at 150–250° C., at a pressure of 1–100 atmospheres, and in contact with a catalyst of dry activated carbon.

References Cited in the file of this patent

UNITED STATES PATENTS 2,900,225 Clasen _____ Aug. 18, 1959

FOREIGN PATENTS 749,408 Great Britain _____ May 23, 1956